No. 641,399. Patented Jan. 16, 1900.
J. MEALEY.
THILL COUPLING.
(Application filed Jan. 28, 1899.)
(No Model.)
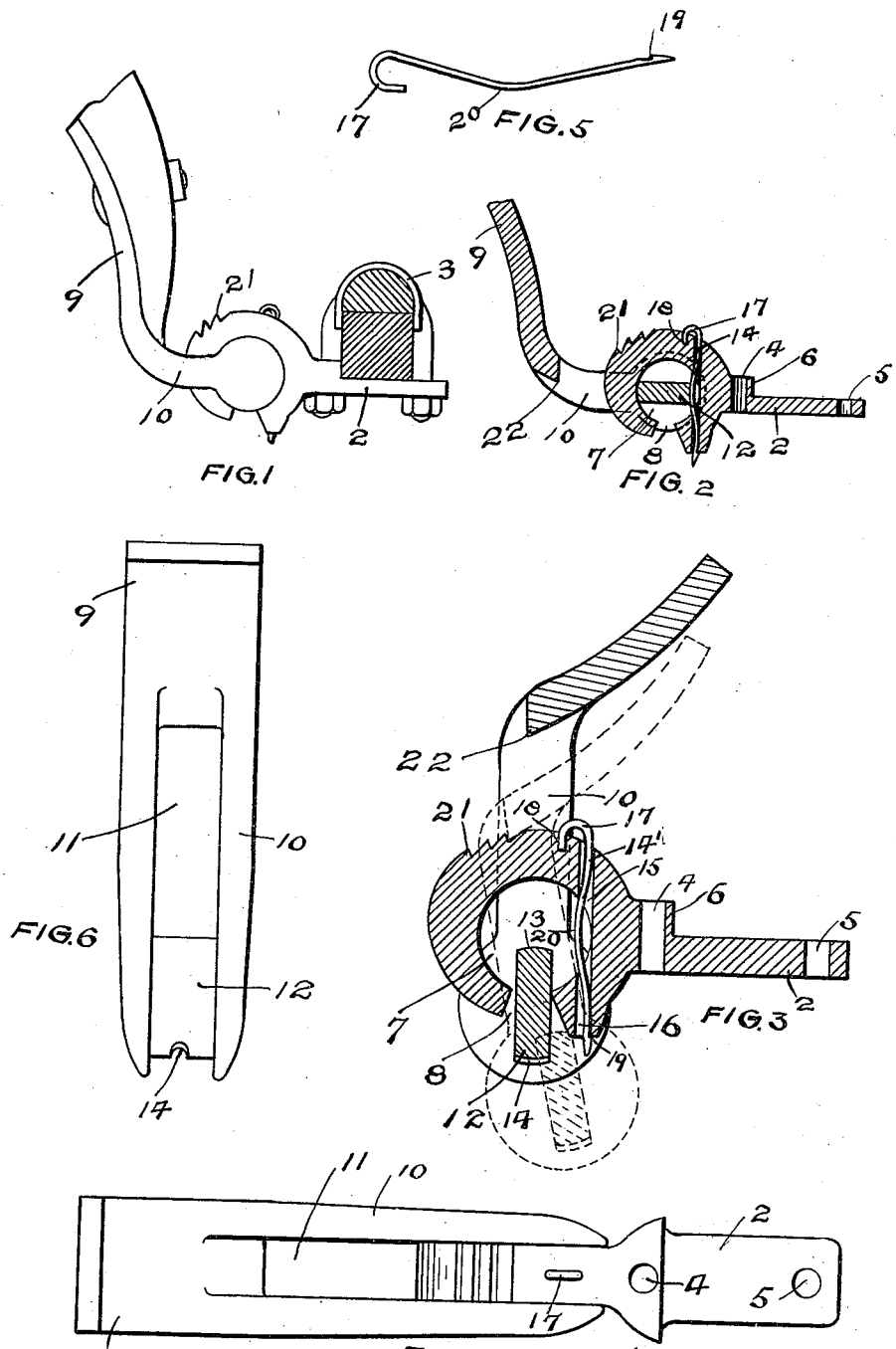
WITNESSES
INVENTOR
JOHNSTON MEALEY
BY Paul & Hawley
HIS ATTYS.

UNITED STATES PATENT OFFICE.

JOHNSTON MEALEY, OF HOWARD LAKE, MINNESOTA.

THILL-COUPLING.

SPECIFICATION forming part of Letters Patent No. 641,399, dated January 16, 1900.

Application filed January 28, 1899. Serial No. 703,664. (No model.)

*To all whom it may concern:*

Be it known that I, JOHNSTON MEALEY, of Howard Lake, Wright county, State of Minnesota, have invented certain new and useful Improvements in Thill-Couplings, of which the following is a specification.

My invention relates to devices for connecting the thills of a wagon or buggy to the axle; and the objects of the invention are, first, to provide a coupling of very few parts, and therefore one that is simple in construction and inexpensive to manufacture; second, to provide a coupling by means of which the thills or shafts may be connected or disconnected from the axle without the use of tools; third, to provide a coupling by means of which the thills may be supported in an elevated position or be readily detached from the axle when not in use; fourth, to provide an extremely simple antirattling device in connection with the coupling; fifth, to provide a coupling applicable to any form of an axle or thill and one that is neat in appearance and strong and durable.

The invention consists generally in an axle member or shackle having a socket and an opening or slot leading thereto and a thill iron or member having a bar to enter said socket and be locked therein.

Further, the invention consists in an axle member having a socket and an opening leading thereto and a thill-iron having a bar to fit within said socket, said bar being of less thickness but of greater width than the opening leading to said socket to permit the thill-iron and axle member to be coupled or uncoupled when the thills are elevated, but to be locked together when the thills are in their normal or substantially horizontal position.

Further, the invention consists in an axle member having a socket and an opening leading thereto, a thill iron or member having a bar to fit within said socket, and a yielding device to engage said bar within said socket.

Further, the invention consists in various constructions and combinations, all as hereinafter described, and particularly pointed out in the claims.

In the accompanying drawings, forming part of this specification, Figure 1 is a side elevation of a thill-coupling embodying my invention, showing the same in position for use. Fig. 2 is a longitudinal section through the members of the coupling. Fig. 3 is a similar view showing the thill-iron partially disengaged from the shackle, the position when entirely disengaged being represented by dotted lines. Fig. 4 is a plan view of a coupling. Fig. 5 is a detail of the spring-pin. Fig. 6 is a plan view of the thill-iron, showing the groove in the edge of the bar.

In the drawings, 2 represents the axle member or shackle, bound upon the axle and axle-stock by the usual clip 3, said shackle having holes 4 and 5 to receive the ends of the clip and a shoulder 6 to rest against the axle and aid in holding the shackle firmly in position. The forward end of the shackle or axle-bar is enlarged, as shown, and provided with a transverse socket 7, having a rounded surface, access being permitted to said socket through a slot or opening 8, preferably on the under side of the shackle. The thill-iron or other member of the coupling comprises an upwardly-turned part or shank 9, which is bolted to the thills, and a backwardly-extending part 10, having a longitudinal slot 11, and a cross-bar 12, preferably near the end of the member, said cross-bar having rounded edges 13, and one of said edges having a groove 14' for the purpose hereinafter described. The cross-bar 12 is of less thickness than the width of the opening 8, leading to the socket 7, thus permitting the bar to be slipped into the socket when the shafts or thills are elevated. Said bar, however, is of greater width than the width of the opening 8, so that when it has been slipped into the socket and the shafts brought down to their normal or substantially horizontal position the bar cannot drop out of the socket, and consequently the two members of the coupling will be securely locked together, and the rounded edges of the bar being in engagement with the rounded surface of the socket will permit the thills to be moved easily up and down and at the same time causing but little wear upon the moving parts of the coupling. When the thill-iron and the shackle are coupled together, the ends of the shackle will fit snugly into the slot 11 in the thill-iron, so that lateral movement of the parts is prevented; but it is desirable to prevent shaking or rattling of the bar 12 within the socket. I therefore provide a pin 14, preferably of spring-wire, passing preferably through holes 15 and 16 in the shackle at the rear side of the socket 8, said pin having preferably a looped upper end 17 to enter a hole 18 in the top of the shackle, whereby the pin is prevented from twisting in either direction, and at its lower end a notch 19, forming a shoulder to engage the shackle and prevent the pin from slipping out while the coupling is in use, though allowing it to be readily withdrawn when desired. The pin 14 is also preferably provided near its middle portion with a curve 20, which projects forward into the socket and enters the groove 14' in the curved rear edge of the bar 12 and effectually prevents the bar from shaking in the socket; but as the contact between the curved rear edge of the bar and the curved part 20 is at one point only it follows that such engagement in no way interferes with the free up-and-down movement of the bar and the thill-iron.

It is frequently desirable to elevate the thills out of the way when the wagon or carriage is standing in the stable or carriage-house, and I therefore provide a series of projections or teeth 21 in the top of the shackle and an edge 22 on the thill-iron at the forward end of the slot 11 to engage said teeth and support the thills in an elevated position, as indicated by dotted lines in Fig. 3.

If preferred, the thills may be entirely removed from the shackle instead of supporting them upon the teeth 21, and when so removed the strain upon the spring-pin will be relieved and the life of the spring device greatly increased.

The thill-iron and shackle are preferably drop-forged, and the coupling being composed of but few parts can be manufactured and sold very cheaply, and the thills can be very quickly connected to the shackle whenever desired, as no tools are required to make the connection.

Obviously any one skilled in the art may vary or modify the construction of my improved thill-coupling, and I therefore do not confine myself to the details herein shown and described.

Having thus described my invention, I claim as new and desire to secure by Letters Patent—

1. A thill-coupling comprising an axle member or shackle, having a socket and a slot leading thereto, a series of teeth in the surface of said shackle, a thill-iron having a bar adapted to enter said slot when the thills are elevated and fit within said socket, and said thill-iron being also provided with a shoulder or edge to engage said teeth, substantially as described.

2. In a thill-coupling, the combination, with a shackle or axle member having a socket 7 and a slot 8 leading thereto, of a thill-iron having a slot 11 to receive the end of said shackle, and a bar 12 to enter said slot when the thills are elevated, said bar being of greater width than said slot to prevent the members from uncoupling when the thills are in their normal position, and a pin 14 provided in said shackle, and having a curved portion 20 to engage the edge of said bar, substantially as described.

3. A thill-coupling, comprising an axle member or shackle having a cylindrical transverse socket 7 and a slot 8 leading to said socket, a thill-iron having a longitudinal slot 11 to receive the end of said shackle, a flat cross-bar 12 of less thickness but of greater width than the width of said slot to permit it to enter said cylindrical socket when the thills are elevated and be locked therein when the thills are in their normal position, and a spring-pin provided in said shackle to engage the edge of said cross-bar and prevent the same from shaking or rattling in said socket, substantially as described.

4. A thill-coupling, comprising an axle member or shackle having a transverse socket 7 and a slot 8 leading thereto and a series of teeth or projections in its upper side, a thill iron or member having a longitudinal slot 11 to receive the end of said shackle, and a cross-bar 12 adapted to enter said socket through said slot when the thills are elevated and be locked therein when the thills are in their normal position, and a shoulder on said thill-iron to engage said teeth or projections, substantially as described.

5. In a thill-coupling the combination, with a shackle having a socket and a slot upon its under side leading thereto and provided in its upper surface with a series of teeth or projections, of a thill-iron having a cross-bar adapted to enter said socket through said slot when the thills are elevated and to be locked therein when the thills are in their normal position, a shoulder provided on said thill-iron to engage said teeth or projections when the thills are elevated to support them in an upright position and permit said cross-bar to drop out of said socket and a spring-pin provided in said shackle in position to be engaged by said cross-bar when the same is within said socket and said thills are in their normal position and to be disengaged or released therefrom when the thills are elevated and supported upon said teeth or projections, substantially as described.

6. In a thill-coupling, the combination, with a shackle having a transverse socket 7 and a slot 8 leading thereto, of a thill-iron having a cross-bar 12 adapted to enter said socket through said slot when the thills are elevated and be locked therein when the thills are in their normal position, a groove 14' provided in the edge of said cross-bar, and a spring-pin 14 fitting within an opening in said shackle and having a curved portion 20 to enter said groove 14', substantially as described.

In witness whereof I have hereunto set my hand this 20th day of January, 1899.

JOHNSTON MEALEY.

In presence of—
RICHARD PAUL,
M. C. NOONAN.